United States Patent
Riess et al.

(10) Patent No.: US 8,429,479 B2
(45) Date of Patent: Apr. 23, 2013

(54) METHOD AND SYSTEM TO INCREASE THE THROUGHPUT OF A HYBRID AUTOMATIC REPEAT REQUEST (HARQ) PROTOCOL

(75) Inventors: Eilon Riess, Zichron Yeakov (IL); Amir Rubin, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 712 days.

(21) Appl. No.: 12/561,126

(22) Filed: Sep. 16, 2009

(65) Prior Publication Data

US 2011/0066912 A1    Mar. 17, 2011

(51) Int. Cl.
*H03M 13/00*    (2006.01)

(52) U.S. Cl.
USPC ........................................................ 714/751

(58) Field of Classification Search .................. 714/748, 714/751, 752, 718, 788, 776, 746, 749, 758, 714/799; 370/216, 229
See application file for complete search history.

(56) References Cited

U.S. PATENT DOCUMENTS

| | | | | |
|---|---|---|---|---|
| 6,700,867 | B2* | 3/2004 | Classon et al. | 370/216 |
| 8,060,801 | B2* | 11/2011 | Seol et al. | 714/748 |
| 8,156,407 | B2* | 4/2012 | Franovici | 714/776 |
| 2009/0006778 | A1 | 1/2009 | Sidi et al. | |
| 2009/0059801 | A1 | 3/2009 | Garrett et al. | |
| 2009/0168920 | A1* | 7/2009 | Chen | 375/295 |
| 2012/0066562 | A1* | 3/2012 | Riess et al. | 714/751 |

OTHER PUBLICATIONS

International Preliminary Report on Patentability mailed Mar. 29, 2012 from International Application No. PCT/US2010/047555.
International Search Report and Written Opinion for International Patent Application No. PCT/US2010/047555, Mailed May 24, 2011, 11 pages.
Park, Bumsoo , et al., "Hybrid ARQ Using Modulation Switching", Proceedings of IEEE 69th Vehicular Technology Conference, Apr. 26-29, 2009, 5 pages.
IEEE Computer Society, "Part 11: Wireless LAN Medium Access Control (MAC) and Physical Layer (PHY) Specifications," IEEE Standard for Information technology—Telecommunications and Information exchange between systems—Local and metropolitan area networks—Specific requirements, IEEE Std 802.11-2007, Revision of IEEE Std 802.11-1999, pp. 268-269, Jun. 12, 2007, Section 9.2.8, New York, New York.

(Continued)

*Primary Examiner* — Phung M Chung
(74) *Attorney, Agent, or Firm* — Schwabe, Williamson & Wyatt, P.C.

(57) ABSTRACT

A method and system to increase the throughput of a HARQ protocol in a wireless network. When a station receives a downlink HARQ sub-burst that has an incorrect cyclic redundancy check, it determines if there is an overflow event of its buffer. If so, the station reduces the size of the HARQ sub-burst to be stored in the buffer and stores the resized HARQ sub-burst in the buffer. When the station transmits an uplink HARQ sub-burst, the station can reduce the size of the transmitted HARQ sub-burst if it exceeds the size of the buffer. The amount of buffer required in the station can also be reduced by representing each log likelihood ratio (LLR) value of each of one or more bits of each symbol of a HARQ burst with a number of quantization bits based on a metric sensitivity to noise of each bit of each symbol.

19 Claims, 6 Drawing Sheets

OTHER PUBLICATIONS

IEEE Computer Society, "Part 15.1: Wireless medium access contol (MAC) and physical layer (PHY) specifications for wireless personal area networks (WPANs)," IEEE Standard for Information technology—Telecommunications and Information exchange between systems—Local and metropolitan area networks—Specific requirements, IEEE Std 802.15.1-2005, Revision of IEEE Std 802.15.1-2002, pp. 96-107, Jun. 14, 2005, Section 8.7, New York, New York.

IEEE Computer Society, "Part 16: Air Interface for Fixed Broadband Wireless Access Systems," IEEE Standard for Local and metropolitan area networks, IEEE Std 802.16-2004, Revision of IEEE Std 802.16-2001, pp. 128-138, Oct. 1, 2004, Section 6.3.4, New York, New York.

Office Action issued Feb. 13, 2013 in Russian Application No. 2012112427.

* cited by examiner

METHOD AND SYSTEM TO INCREASE THE THROUGHPUT OF A HYBRID AUTOMATIC REPEAT REQUEST (HARQ) PROTOCOL

FIELD OF THE INVENTION

This invention relates to a wireless network, and more specifically but not exclusively, to increase the throughput of a hybrid automatic repeat request protocol used in the wireless network.

BACKGROUND DESCRIPTION

In a wireless network, a hybrid automatic repeat request (HARQ) protocol is used to ensure high reliability and high data transmission efficiency of the wireless network. The HARQ protocol combines a forward error correction (FEC) scheme and an automatic repeat request (ARQ) scheme.

FIG. 1A illustrates a block diagram 100 of a prior art HARQ burst 120. When data is to be sent from a sending station to a receiving station in a wireless network, the data is sent in the form of medium access control (MAC) packet data units (PDUs) 110. The MAC layer of the sending station concatenates the PDUs 112, 114, 116, and 118 and the physical (PHY) layer of the sending station adds a preamble 122 to the concatenated PDUs 112, 114, 116, and 118 to form a HARQ burst 120 for transmission. The PDUs 112, 114, 116, and 118 are divided or partitioned into the FEC blocks 124, 126, and 128 by the PHY layer of the sending station.

The downlink (DL) throughput of the HARQ protocol used in a station may be limited to a maximum limit to guarantee that the throughput of the HARQ protocol does not exceed the buffering capabilities of the station. FIG. 1B illustrates two scenarios 150 of the memory state of a buffer in a prior art station. The first scenario, where there is no overflow of memory 160, occurs when the buffer in the station has sufficient free memory space 166 to store a HARQ sub-burst 170 that fails a cyclic redundancy check. The HARQ sub-burst 170 may be a retransmission of the same burst that has been stored in the station as the HARQ sub-bursts 162 and 164.

To increase the throughput of the HARQ protocol used in a station, the size of each HARQ sub-burst can be increased. However, increasing the size of each HARQ sub-burst has a drawback because the station may experience more memory overflows in its buffer. This is illustrated in the second scenario, where there is an overflow of memory 180, that occurs when the buffer in the station has insufficient free memory space 186 to store the HARQ sub-burst 170 that fails a cyclic redundancy check. The station therefore aborts storing the HARQ sub-burst 170 and clears the HARQ sub-burst 170.

The current HARQ protocol implementation does not allow the throughput of the HARQ protocol to be increased or to decrease the number of occurrences of memory overflow events in a wireless network.

BRIEF DESCRIPTION OF THE DRAWINGS

The features and advantages of embodiments of the invention will become apparent from the following detailed description of the subject matter in which.

DETAILED DESCRIPTION

Figure 1A:
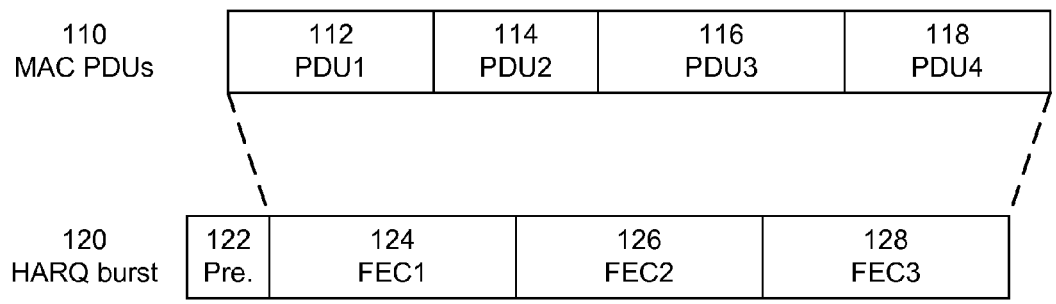
FIG. 1A illustrates a block diagram of a prior art HARQ burst.
Figure 1B:
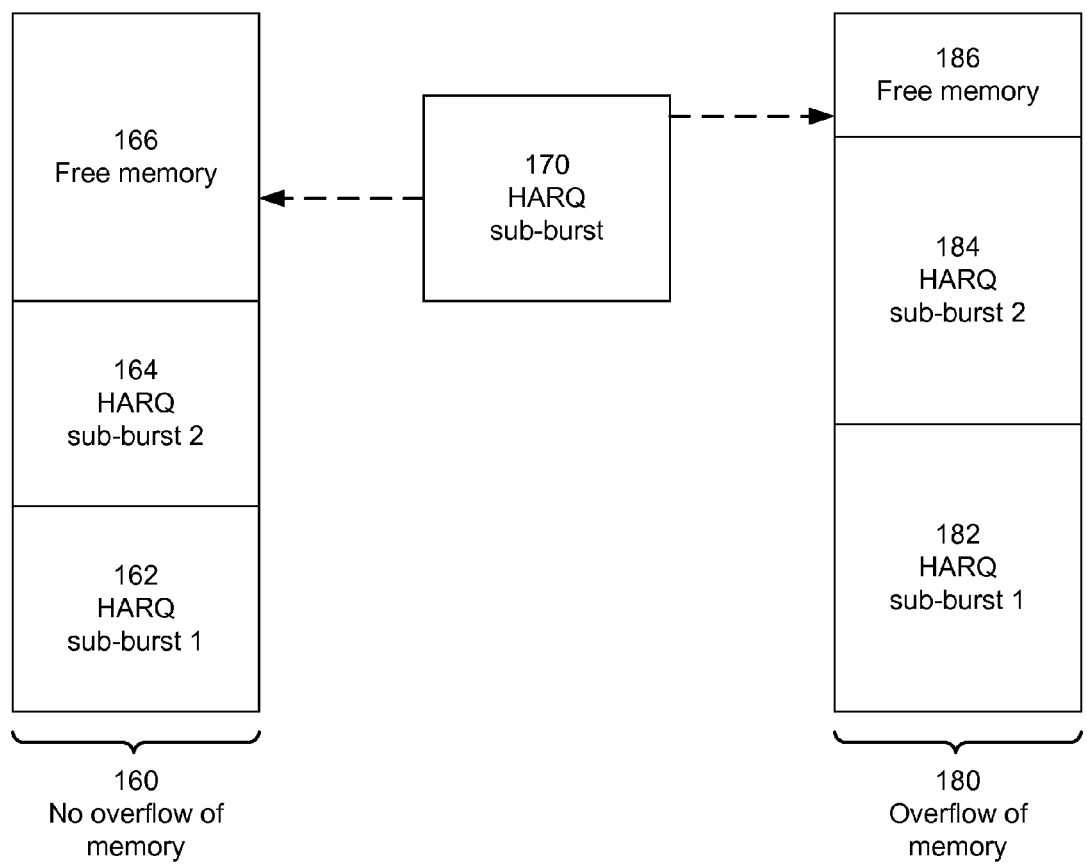
FIG. 1B illustrates two scenarios of the memory state of a buffer in a prior art station.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system to increase the throughput of a HARQ protocol used in a wireless network. In one embodiment of the invention, when a station in the wireless network receives a HARQ sub-burst or sub-packet that has an incorrect cyclic redundancy check (CRC), it determines or detects if there is a memory overflow event of its buffer. If there is a memory overflow event, the station reduces the size of the received HARQ sub-burst. In one embodiment of the invention, the station reduces the size of the received HARQ sub-burst by removing a portion of the received HARQ sub-burst.

After reducing the size of the HARQ sub-burst, the station stores the resized HARQ sub-burst in the buffer if the buffer has sufficient space to store the resized HARQ sub-burst in one embodiment of the invention. By reducing the size of the HARQ sub-burst to be stored in the buffer, it increases the throughput of the HARQ protocol in the wireless network as the probability of a memory overflow event in the buffer is reduced in one embodiment of the invention.

The station includes, but is not limited to, a base station, a mobile station or any other device capable of receiving a HARQ burst. The wireless network is compliant at least in part with, but not limited to, the Institute of Electrical and Electronics Engineers (IEEE) 802.11 standard ("IEEE standard 802.11-2007, published Jun. 12, 2007") and its related family, IEEE 802.15 standard ("IEEE standard 802.15.1-2005, published Jun. 14, 2005") and its related family, IEEE 802.16 standard ("IEEE standard 802.16-2004, published Oct. 1, 2004") and its related family, 3rd Generation Partnership Project (3GPP) Long Term Evolution (LTE) standard, and the like.

Figure 2:
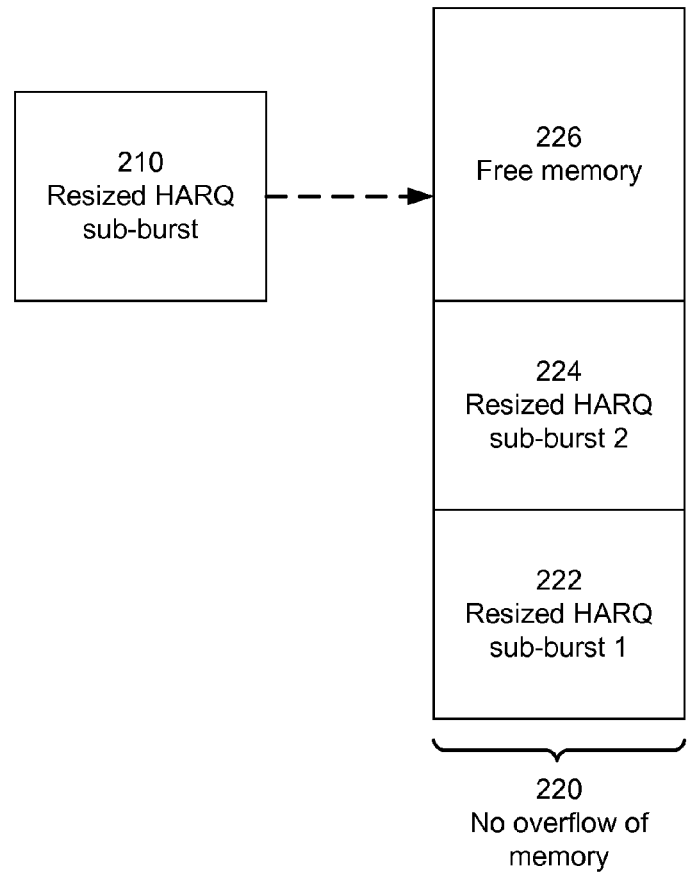
FIG. 2 illustrates a scenario of the memory state of a buffer in a station in accordance with one embodiment of the invention.

FIG. 2 illustrates a scenario of the memory state of a buffer in a station in accordance with one embodiment of the invention. In one embodiment of the invention, when the station receives a HARQ sub-burst, it checks if the CRC of the HARQ sub-burst is correct. If the CRC of the HARQ sub-burst is correct, the station sends a HARQ acknowledgement (ACK) to the other station that has sent the HARQ sub-burst. The HARQ ACK indicates to the other station that the HARQ sub-burst is received correctly.

If the CRC of the HARQ sub-burst is incorrect, the station sends a HARQ negative ACK (NACK) to the other station that has sent the HARQ sub-burst. The HARQ NACK indicates to the other station that the HARQ sub-burst is received incorrectly and the other station may retransmit the same HARQ sub-burst again in accordance with a HARQ protocol that uses Chase combining.

In one embodiment of the invention, if the station has previously stored one or more copies of a particular HARQ sub-burst, the station performs Chase combining to combine a retransmission of the particular HARQ sub-burst with the one or more stored copies of the particular HARQ sub-burst. The station performs a CRC check of the combined HARQ sub-burst to determine if the HARQ sub-burst is received correctly.

In one embodiment of the invention, when the station determines that its buffer has insufficient space to store a received HARQ sub-burst, the station reduces the size of the received HARQ sub-burst to obtain a resized HARQ sub-burst 210. In one embodiment of the invention, the station reduces the size of the received HARQ sub-burst by discarding some of the slots in the received HARQ sub-burst. By reducing the size of the received HARQ sub-burst, the memory space requirements of the buffer to store the resized HARQ sub-burst 210 is reduced and the chance or probability of a memory overflow event of the buffer is lowered.

In another embodiment of the invention, the station may also reduce the size of HARQ sub-burst(s) stored in its buffer to increase the amount of free memory space. The scenario illustrated in FIG. 2, where there is no overflow of memory 220, occurs when the buffer in the station has sufficient free memory space 226 to store a resized HARQ sub-burst 210 that fails a cyclic redundancy check. The station reduces the size of the stored resized HARQ sub-bursts 222 and 224 in one embodiment of the invention to increase the amount of free memory space 226 to store the resized HARQ sub-burst 210. The resized HARQ sub-bursts 210, 222 and 224 originate from the same particular HARQ burst that has been sent three times.

Figure 3:
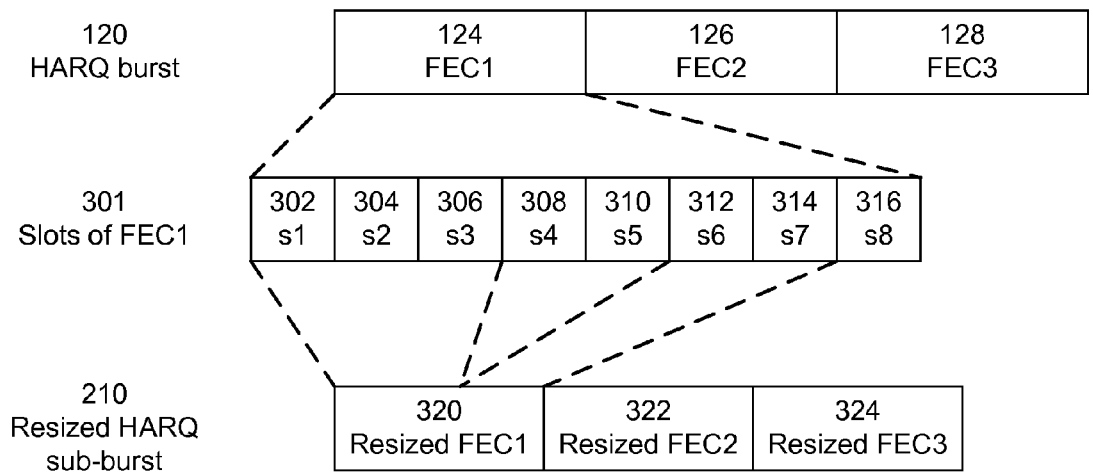
FIG. 3 illustrates a block diagram of a resized HARQ sub-burst in accordance with one embodiment of the invention.

FIG. 3 illustrates a block diagram 300 of a resized HARQ sub-burst 210 in accordance with one embodiment of the invention. In one embodiment of the invention, each FEC block of the HARQ burst 120 is divided or partitioned into one or more slots. Each slot is a logical unit of each FEC block of the HARQ burst 120. In one embodiment of the invention, each slot of each FEC block of the HARQ burst 120 is based on, but not limited to, time domain duplex (TDD) division, frequency domain duplex (FDD) division and the like. One of ordinary skill in the relevant art can use other methods of dividing each FEC block of the HARQ burst 120 for transmission and these methods are applicable to the invention without affecting the workings of the invention.

The HARQ burst 120 has slots s1 to s8 (302, 304, 306, 308, 310, 312, 314, and 316) in the FEC1 block 124. The FEC2 block 126 and FEC3 block 128 are similarly partitioned into a number of slots but are not shown for clarity of illustration. In one embodiment of the invention, the number of slots in the FEC blocks 124, 126, and 128 is the same. In another embodiment of the invention, the number of slots in the FEC blocks 124, 126, and 128 may be different. Although the HARQ burst 120 is illustrated with three FEC blocks 124, 126, and 128, it is not meant to be limited. In another embodiment of the invention, the HARQ burst 120 has more than three FEC blocks. In yet another embodiment of the invention, the HARQ burst 120 has only one FEC block.

When the station receives the HARQ burst 120, the station determines whether the HARQ burst 120 is received correctly. If the HARQ burst 120 is received incorrectly, the station stores only a portion of each FEC block of the HARQ burst 120 in one embodiment of the invention. This is illustrated in the resized HARQ sub-burst 210 that has three resized FEC blocks 320, 322, and 324. The resized FEC1 block 320 has slots s1 302, s2 304, s3 306, s6 312, and s7 314 of the FEC1 block 124. The slots s4 308, s5 310, and s8 316 are discarded or removed from the HARQ burst 120 and the remaining slots of the HARQ burst 120 are stored as the resized HARQ sub-burst 210 in one embodiment of the invention. Similarly, the resized FEC blocks 322 and 324 have at least one slot removed from the FEC blocks 126 and 128 respectively but are not shown in FIG. 3 for clarity of illustration.

In one embodiment of the invention, the selection of the slots to be discarded or removed from the HARQ burst 120 is based at least in part on, but not limited to, the ease of implementation of the logic to discard the slots, the desired diversity gain, the amount of memory buffer, the cost of the memory buffer, the occupancy level of the memory buffer, and the like. In one embodiment of the invention, the number of slots discarded from each FEC block of the HARQ burst 120 is the same.

In another embodiment of the invention, the number of slots removed from each FEC block of the HARQ burst 120 is different.

For example, in one embodiment of the invention, the station removes three slots from the FEC1 block 124 and stores the remaining slots of FEC1 block 124 as the resized FEC1 block 320, remove two slots from the FEC2 block 126 and stores the remaining slots of FEC2 block 126 as the resized FEC2 block 322, and does not remove any slots in the FEC3 block 128 and stores the entire FEC3 block 128 in the resized HARQ sub-burst 210.

In one embodiment of the invention, the slots in each FEC block of the HARQ burst 120 are interleaved and the station discards a number of sequential slots from each FEC block of the HARQ burst 120. For example, in one embodiment of the invention, the station discards the first two sequential slots of each FEC block of the HARQ burst 120. In another embodiment of the invention, the station discards the last three sequential slots of each FEC block of the HARQ burst 120. In yet another embodiment of the invention, the station discards a fixed percentage of slots in each FEC block of the HARQ burst 120. For example, in one embodiment of the invention, the station removes 20% of the slots in each FEC block of the HARQ burst 120, i.e., when each FEC block of the HARQ burst 120 has 10 slots, the station stores only eight slots of each FEC slot of the HARQ burst 120.

In yet another embodiment of the invention, the station uses the estimated reliability or the estimated level of confidence of the contents in the HARQ burst 120 to determine the number of slots to discard in each FEC block of the HARQ burst 120. For example, in one embodiment of the invention, if the station determines that the reliability of the contents in the HARQ burst 120 is high, the station stores less of the HARQ burst 120 and discards more slots in each FEC block of the HARQ burst 120. Similarly, if the station determines that the reliability of the contents in the HARQ burst 120 is low, the station stores more of the HARQ burst 120 and discards less slots in each FEC block of the HARQ burst 120. In one embodiment of the invention, the reliability of the contents or data in the HARQ burst 120 is estimated or determined from the log likelihood ratio (LLR) for each bit of each symbol of the HARQ burst. In another embodiment of the invention, the reliability of the contents or data in the HARQ burst 120 is estimated or determined from the channel quality indicator (CQI) information that is received by the station. One of ordinary skill in the relevant art will appreciate that other methods of determining how many slots, and which slots to remove, can be used and these methods can be used in the invention without affecting the workings of the invention.

Figure 4:
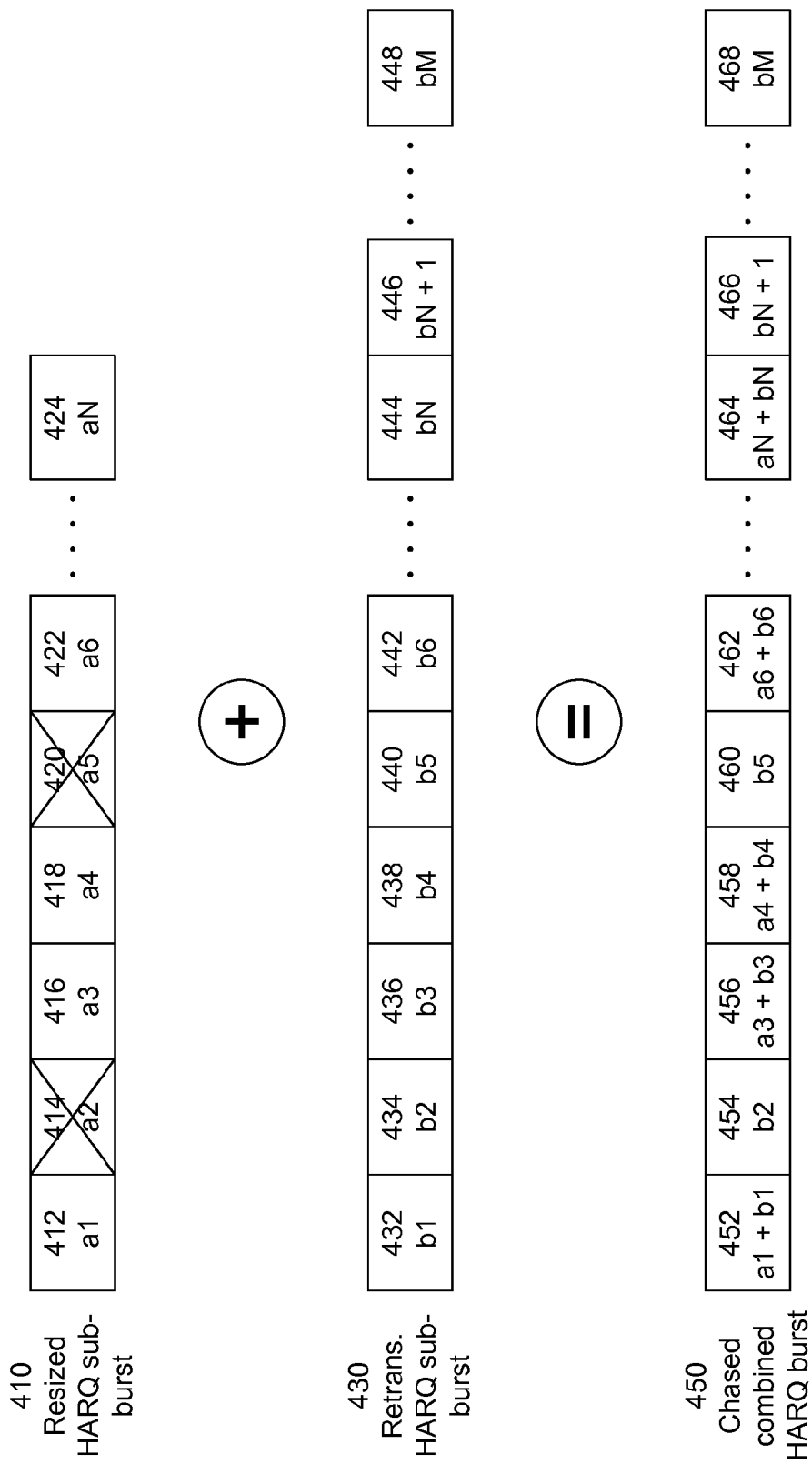
FIG. 4 illustrates a Chase combining of two HARQ sub-bursts in accordance with one embodiment of the invention.

FIG. 4 illustrates a Chase combining 400 of two HARQ sub-bursts in accordance with one embodiment of the invention. In FIG. 4, it is assumed for the purposes of illustration that the station has stored a resized HARQ sub-burst 410 in its memory buffer and the station has received a retransmitted HARQ sub-burst 430. The resized HARQ sub-burst 410 does not have slots a2 414 and a5 420 and the retransmitted HARQ burst 430 has M slots from b1 432 to bM 448.

In one embodiment of the invention, the station combines the stored resized HARQ sub-burst 410 and the retransmitted HARQ sub-burst 430 using at least in part, a Chase combining scheme or any other code combining scheme that uses retransmissions of the same data burst or packet. Each respective slot of the stored resized HARQ sub-burst 410 and the retransmitted HARQ sub-burst 430 are combined based on the position or order of the slots. For example, the first slot a1 412 of the stored resized HARQ sub-burst 410 and the first slot b1 432 of the retransmitted HARQ sub-burst 430 are combined to form the first slot a1+b1 452 of the chased combined HARQ burst 450.

When a particular slot is not present in the stored resized HARQ sub-burst 410, no Chase combining is performed. For example, the stored resized HARQ sub-burst 410 does not have the second slot a2 414 and therefore no Chase combining is performed for the second slot b2 454 of the chased combined HARQ burst 450. The second slot b2 454 of the chased combined HARQ burst 450 has the second slot b2 434 of the retransmitted HARQ sub-burst 430. Similarly, the stored resized HARQ sub-burst 410 does not have the fifth slot a5 420 and therefore no Chase combining is performed for the fifth slot b5 460 of the chased combined HARQ burst 450. The fifth slot b5 460 of the chased combined HARQ burst 450 has the fifth slot b5 440 of the retransmitted HARQ sub-burst 430. One of ordinary skill in the relevant art will readily appreciate how the other slots of the chased combined HARQ burst 450 are formed and it will not be discussed herein.

When Chase combining of the stored resized HARQ sub-burst 410 and the retransmitted HARQ sub-burst 430 is completed, the station calculates the CRC of the chased combined HARQ burst 450 to determine if there are any errors. If the CRC is incorrect, the station may reduce the size of the retransmitted HARQ sub-burst 430 and stores the resized HARQ sub-burst in one embodiment of the invention.

In one embodiment of the invention, when the slots of the FEC blocks in the stored resized HARQ sub-burst 410 and the retransmitted HARQ sub-burst 430 are interleaved, by performing Chase combining of the stored resized HARQ sub-burst 410 and the retransmitted HARQ sub-burst 430, the processing gain of the station is improved as the FEC likelihood of being correctly decoded is increased. The chances of the HARQ sub-burst passing the CRC are increased and the diversity gain remains the same even though some slots are removed. This is because the diversity gain is related only to the retransmission of the failed HARQ sub-burst when the channel conditions of the wireless network improves.

Embodiments of the invention allow savings in chip area and power consumption as the amount of memory buffer space required to maintain a desired throughput of the HARQ protocol can be reduced. This is very helpful if the station has limited chip area or has to fulfill a low cost target. In addition, embodiments of the invention allow a station to reach a high throughput of the HARQ protocol used in the wireless network.

Figure 5A:
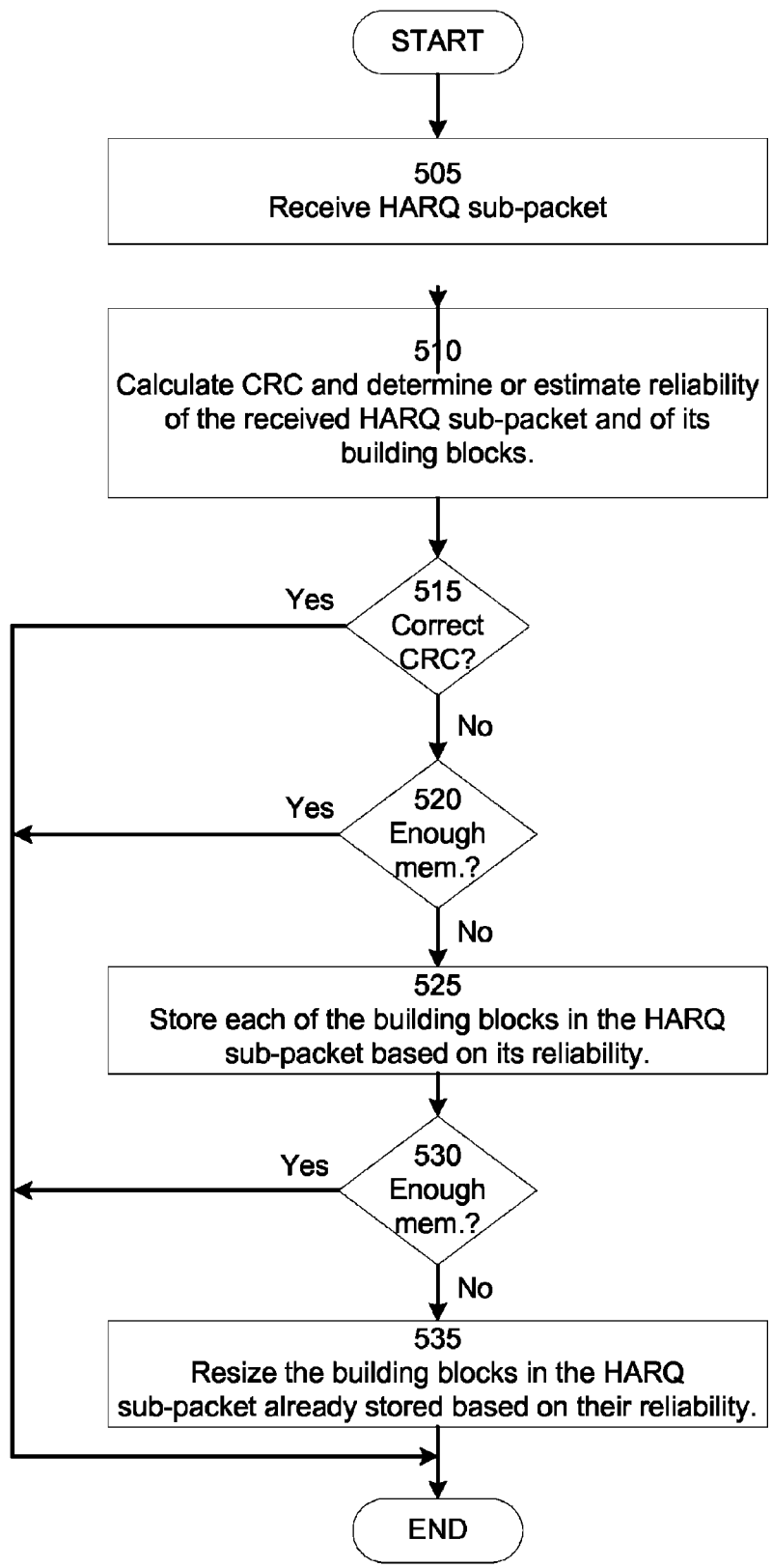
FIG. 5A illustrates a flowchart to implement the methods disclosed herein in accordance with one embodiment of the invention.

FIG. 5A illustrates a flowchart 500 to implement the methods disclosed herein in accordance with one embodiment of the invention. In step 505, a station receives a HARQ sub-packet. In step 510, the station calculates the CRC of the HARQ sub-packet and determines or estimates the reliability of the HARQ sub-packet and of its building block(s). In one embodiment of the invention, the building block(s) in the HARQ sub-packet includes, but is not limited to, an error correction code block, a FEC block, an independent data unit and the like. In one embodiment of the invention, if there are one or more stored copies of the HARQ sub-packet in a memory buffer, the station performs a Chase combining of the received HARQ sub-packet with the one or more stored copies of the HARQ sub-packet to form a combined HARQ packet. The station calculates the CRC of the combined HARQ packet.

In step 515, the station checks if the CRC of the received HARQ sub-packet is correct. If yes, the flow 500 ends. If no, the station checks if there is sufficient space in the memory buffer to store the received HARQ sub-packet in step 520. If there is sufficient space in the memory buffer, the flow 500 ends. If there is insufficient space in the memory buffer, the station stores each of the building block(s) in the received HARQ sub-packet based on the determined or estimated reliability of the HARQ sub-packet and of its building blocks in step 525.

The station checks if there is sufficient space in the memory buffer in step 530. If yes, the flow 500 ends. If no, the station reduces the building block(s) in the received HARQ sub-packet already stored in the memory buffer based on the determined or estimated reliability of the HARQ sub-packet and of its building blocks in step 535 and the flow ends. In one embodiment of the invention, the station reduces the building block(s) in the received HARQ sub-packet by removing one or more slots of each FEC block of the HARQ sub-packet to obtain a resized HARQ sub-packet. The number of slots of each FEC block of the HARQ sub-packet to be removed is dependent on the determined or estimated reliability of the HARQ sub-packets and of its building block(s) in one embodiment of the invention.

The step 535 increases the amount of free memory in the memory buffer of the station. The flow 500 illustrated is not meant to be limiting and some of the steps illustrated in flow 500 do not have to be performed sequentially and can be performed in parallel. Embodiments of the invention reduce the occurrence of a memory overflow event in the station to increase the throughput of the HARQ protocol.

Figure 5B:
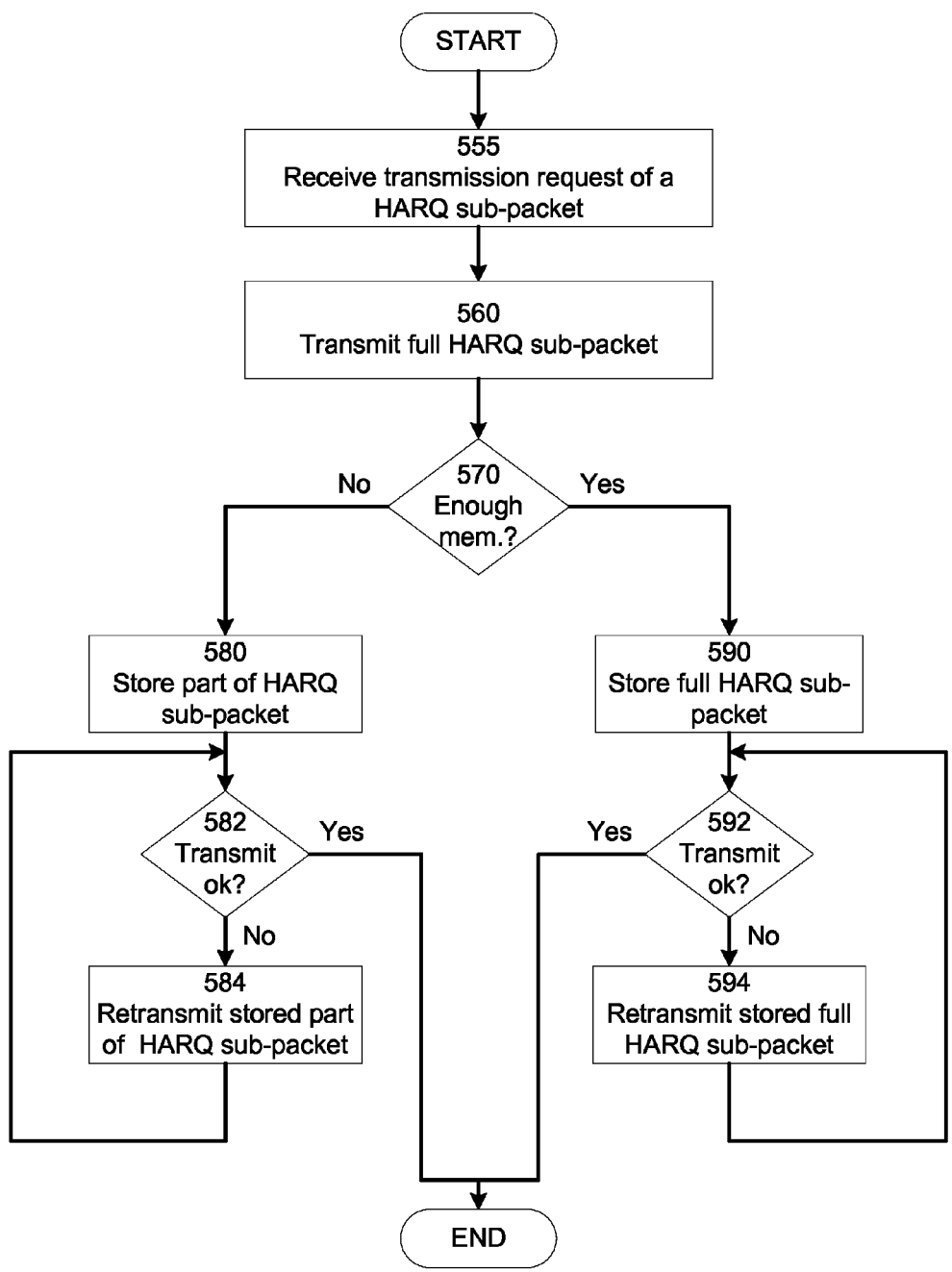
FIG. 5B illustrates a flowchart to implement the methods disclosed herein in accordance with one embodiment of the invention.

FIG. 5B illustrates a flowchart 550 to implement the methods disclosed herein in accordance with one embodiment of the invention. The size of the memory buffer for uplink (UL) HARQ protocol determines the maximum transmission block size per frame and it therefore limits the UL HARQ protocol throughput. The flowchart 550 illustrates the steps to increase or improve the UL throughput of the HARQ protocol used in a mobile station.

In step 555, the mobile station receives a transmission request of a HARQ sub-packet or sub-burst. In step 560, the full HARQ sub-packet is transmitted to the receiving station, i.e., a base station. The mobile station checks if there is enough UL memory buffer to store the HARQ sub-packet in step 570. In another embodiment of the invention, steps 560 and 570 are performed concurrently or substantially in parallel.

If there is sufficient memory buffer in step 570, the mobile station stores the full HARQ sub-packet in step 590. The mobile station checks if the transmitted full HARQ sub-packet is transmitted successful in step 592. For example, in one embodiment of the invention, the mobile station can determine if the transmission of the HARQ sub-packet is successful based on whether an ACK or NACK is received from the base station. If the transmission of the HARQ sub-packet is successful, i.e., an ACK is received, the flow ends. If the transmission of the HARQ sub-packet is not successful, i.e., a NACK is received, the mobile station retransmits the stored full HARQ sub-packet if required in step 594 and the flow goes back to step 592.

If there is insufficient memory buffer in step 570, the mobile station stores only part of the HARQ sub-packet in step 580. For example, in one embodiment of the invention, the mobile station stores only 75% of the slots in each FEC of the HARQ sub-packet. The other 25% of the slots in each FEC of the HARQ sub-packet are discarded. One of ordinary skill in the relevant art will readily appreciate that other methods of storing part of the HARQ sub-packet can be applied to the invention without affecting the workings of the invention. By storing only part of the HARQ sub-packet, it allows a larger HARQ sub-packet to be transmitted by the mobile station. This is useful when the UL utilization of the mobile station is high.

In step 582, the mobile station checks if the transmitted HARQ sub-packet is transmitted successfully. If yes, the flow end. If no, the mobile station goes to step 584 to retransmit the stored part of the HARQ sub-packet if required and the flow goes back to step 582. Even though a part of the HARQ sub-packet is not transmitted or stored, the base station is still able to strengthen the log likelihood ratio of the bits that have been stored in the mobile station and therefore strengthen the FEC block as a whole for all the FEC blocks belonging to the HARQ sub-packet.

Figure 6:
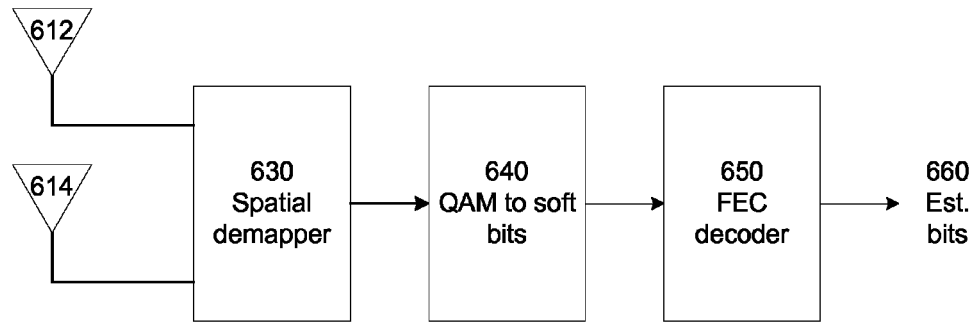
FIG. 6 illustrates a block diagram of a multiple-input multiple-output (MIMO) receiver in a station in accordance with one embodiment of the invention.

FIG. 6 illustrates a block diagram 600 of a multiple-input multiple-output (MIMO) receiver in a station in accordance with one embodiment of the invention. The receiver has two antennas 612 and 614 to receive a HARQ burst. In one embodiment of the invention, the HARQ burst is modulated using a quadrature amplitude modulation (QAM). In 16-QAM and 64-QAM, for example, each bit in a symbol has different immunity to error as the free distance is different for each bit in the symbol.

In one embodiment of the invention, when the receiver operates in accordance with orthogonal frequency division multiplexing (ODFM), the receiver removes the cyclic prefix and performs a Fast Fourier Transform (FFT) for the HARQ burst received at the antennas 612 and 614. The HARQ burst is sent to the spatial demapper module 630 to de-map the QAM symbols of the HARQ burst. The QAM to soft bits module 640 converts the de-mapped QAM symbols to information bits of the HARQ burst. The QAM to soft bits module 640 also calculates the log likelihood ratio (LLR) for each bit of each symbol of the HARQ burst. The log-likelihood ratio (LLR) is the logarithm of the ratio of probabilities of a 0 bit being transmitted versus a 1 bit being transmitted for a received signal.

The calculated LLR for each bit of each symbol of the HARQ burst is quantized and are sent to the FEC decoder 650 to generate the estimated bits 660 of the HARQ burst. In one embodiment of the invention, the receiver represents each log likelihood ratio (LLR) value of each of one or more bits of each symbol of the HARQ burst with a number of quantization bits, where the number of quantization bits is based at least in part on a metric sensitivity to noise of each bit of each symbol. For example, in one embodiment of the invention, when the HARQ burst is modulated using 64-QAM each of the I and Q channels, the receiver uses two quantization bits to represent the LLR value of the most significant bit (MSB) of a symbol, and uses the full six bits for the LLR value of the least significant bit (LSB) of the symbol.

The receiver uses the least number of quantization bits for the LLR value of the MSB of a symbol as it is most robust since the MSB changes only when it across zero. The receiver uses the maximum number of quantization bits for the LLR value of the LSB of a symbol as it is most sensitive to errors since it changes most frequent in the 64-QAM constellation. One of ordinary skill in the relevant will readily appreciate that the LLR of the bits other than the MSB and the LSB can also have a different number of quantization bits.

By using a different number of quantization bits for the LLR based on the metric sensitivity to noise of each bit of each symbol, it allows a trade-off of the signal to noise (SNR) performance with the memory space requirements of the receiver in the station in one embodiment of the invention. One of ordinary skill in the relevant will appreciate other methods of reducing the number of quantization bits for the LLR and these methods are applicable to the invention. In addition, the station may apply the same technique to other orders of QAM.

Figure 7:
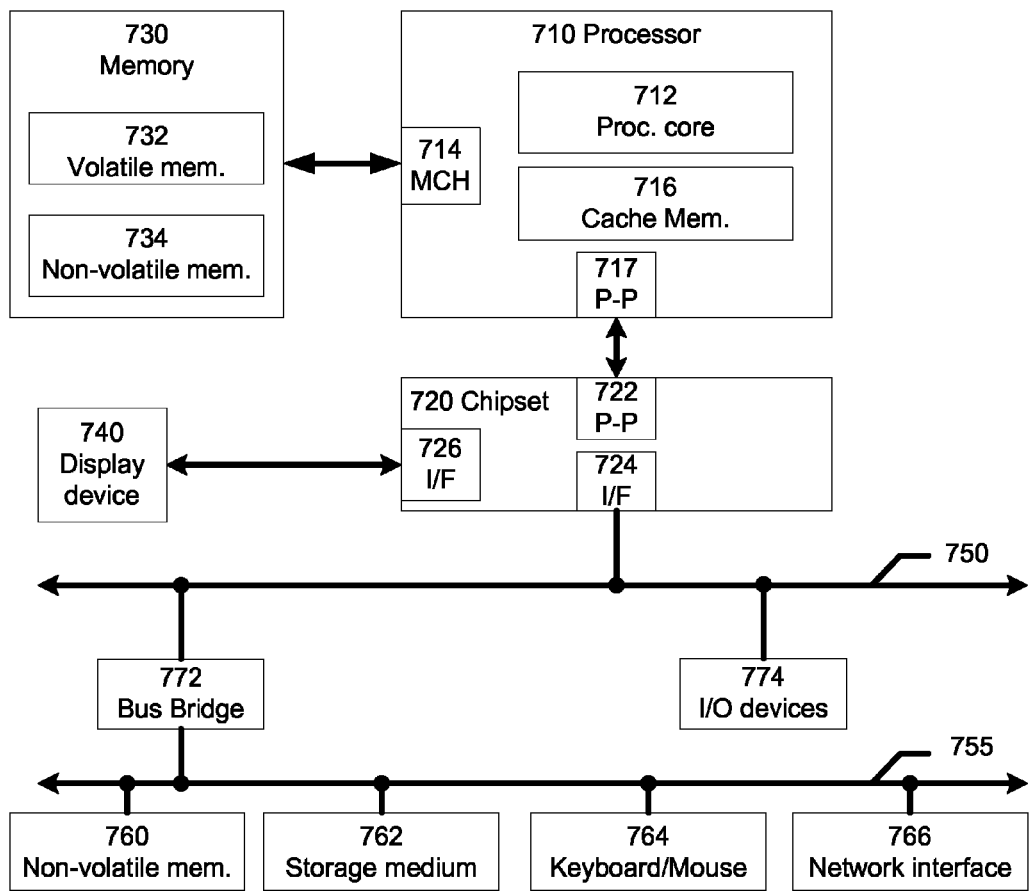
FIG. 7 illustrates a system to implement the methods disclosed herein in accordance with one embodiment of the invention.

FIG. 7 illustrates a system 700 to implement the methods disclosed herein in accordance with one embodiment of the invention. The system 700 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 700 used to implement the methods disclosed herein may be a system on a chip (SOC) system.

The processor 710 has a processing core 712 to execute instructions of the system 700. The processing core 712 includes, but is not limited to, pre-fetch logic to fetch instructions, decode logic to decode the instructions, execution logic to execute instructions and the like. The processor 710 has a cache memory 716 to cache instructions and/or data of the system 700. In another embodiment of the invention, the cache memory 716 includes, but is not limited to, level one, level two and level three, cache memory or any other configuration of the cache memory within the processor 710.

The memory control hub (MCH) 714 performs functions that enable the processor 710 to access and communicate with a memory 730 that includes a volatile memory 732 and/or a non-volatile memory 734. The volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 734 includes, but is not limited to, NAND flash memory, phase change memory (PCM), read only memory (ROM), electrically erasable programmable read only memory (EEPROM), or any other type of non-volatile memory device.

The memory 730 stores information and instructions to be executed by the processor 710. The memory 730 may also stores temporary variables or other intermediate information while the processor 710 is executing instructions. The chipset 720 connects with the processor 710 via Point-to-Point (PtP) interfaces 717 and 722. The chipset 720 enables the processor 710 to connect to other modules in the system 700. In one embodiment of the invention, the interfaces 717 and 722 operate in accordance with a PtP communication protocol such as the Intel® QuickPath Interconnect (QPI) or the like. The chipset 720 connects to a display device 740 that includes, but is not limited to, liquid crystal display (LCD), cathode ray tube (CRT) display, or any other form of visual display device.

In addition, the chipset 720 connects to one or more buses 750 and 755 that interconnect the various modules 774, 760, 762, 764, and 766. Buses 750 and 755 may be interconnected together via a bus bridge 772 if there is a mismatch in bus speed or communication protocol. The chipset 720 couples with, but is not limited to, a non-volatile memory 760, a mass storage device(s) 762, a keyboard/mouse 764 and a network interface 766. The mass storage device 762 includes, but is not limited to, a solid state drive, a hard disk drive, an universal serial bus flash memory drive, or any other form of computer data storage medium. The network interface 766 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 7 are depicted as separate blocks within the system 700, the functions performed by some of these blocks may be integrated within a single semiconductor circuit or may be implemented using two or more separate integrated circuits. For example, although the cache memory 716 is depicted as a separate block within the processor 710, the cache memory 716 can be incorporated into the processor core 712 respectively. The system 700 may include more than one processor/processing core in another embodiment of the invention.

The methods disclosed herein can be implemented in hardware, software, firmware, or any other combination thereof. For example, in one embodiment of the invention, the MAC layer logic has the capability to perform the methods and techniques disclosed herein. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:
   receiving a hybrid automatic repeat request (HARQ) sub-packet having one or more forward error correction (FEC) blocks;
   determining that the HARQ sub-packet was received incorrectly; and
   storing only a portion of each FEC block of the HARQ sub-packet responsive to the determination that the HARQ sub-packet was received incorrectly.

2. The method of claim 1, wherein each FEC block has one or more slots, and wherein storing only the portion of each FEC block of the HARQ sub-packet comprises storing less than all slots of each FEC block.

3. The method of claim 1, wherein determining that the HARQ sub-packet was received incorrectly comprises determining that a cyclic redundancy check (CRC) of the HARQ sub-packet is incorrect.

4. The method of claim 1, further comprising determining that a memory has insufficient space to store the HARQ sub-packet, and wherein storing only the portion of each FEC block of the HARQ sub-packet responsive to the determination that the HARQ sub-packet was received incorrectly comprises storing only the portion of each FEC block of the HARQ sub-packet responsive to the determination that the HARQ sub-packet is received incorrectly and to the determination that the memory has insufficient space to store the HARQ sub-packet.

5. The method of claim 1, further comprising:
   determining that a memory having one or more stored copies of the HARQ sub-packet has insufficient space to store the HARQ sub-packet; and
   discarding less than all slots of at least one of the one or more stored copies of the HARQ sub-packet responsive to the determination that the memory has insufficient space.

6. The method of claim 5, further comprising:
combining the received HARQ sub-packet with at least one of the one or more stored copies of the HARQ sub-packet in accordance at least in part with a Chase combining algorithm.

7. The method of claim 1, wherein the HARQ sub-packet is compliant at least in part with one of an Institute of Electrical and Electronics Engineers (IEEE) 802.11 family of standards, an IEEE 802.15 family of standards, an IEEE 802.16 family of standards, and a third generation partnership project (3GPP) Long Term Evolution (LTE) standard.

8. An apparatus comprising:
a buffer; and
logic coupled with the buffer to:
receive a hybrid automatic repeat request (HARQ) burst;
determine that an overflow event of the buffer is present;
remove, responsive to the determination that the overflow event of the buffer is present, a portion of the received HARQ burst; and
store the received HARQ burst, without the removed portion, in the buffer.

9. The apparatus of claim 8, wherein a cyclic redundancy check (CRC) of the HARQ burst is incorrect.

10. The apparatus of claim 8, wherein the logic is further to determine a reliability or a level of confidence of the HARQ burst and wherein the logic to remove the portion of the received HARQ burst to be stored in the buffer responsive to the determination is to remove the portion of the received HARQ burst to be stored in the buffer based at least in part on the determined reliability or the determined level of confidence of the HARQ burst responsive to the determination.

11. The apparatus of claim 8, wherein the received HARQ burst comprises one or more forward error correction (FEC) blocks, and wherein the logic to remove the portion of the received HARQ burst is to remove a part of each FEC block of the received HARQ burst.

12. The apparatus of claim 11, wherein each FEC block comprises one or more slots, and wherein the logic to remove the part of each FEC block of the received HARQ burst is to:
select less than all slots of each FEC block of the received HARQ burst; and
discard the selected less than all slots of each FEC block of the received HARQ burst.

13. The apparatus of claim 11, wherein the logic to select the one or more slots of each FEC block is based at least in part on one of an ease of implementation logic to remove the selected one or more slots of each FEC block, a size of the buffer, a cost of the buffer and the occupancy level of the buffer.

14. The apparatus of claim 8, wherein the buffer is to store one or more copies of the received HARQ burst, and wherein the logic is further to discard less than all slots of at least one of the one or more stored copies of the received HARQ burst.

15. The apparatus of claim 14, wherein the logic is further to combine the received HARQ burst without the removed portion with the at least one stored copy of the received HARQ burst without the removed portion in accordance at least in part with a Chase combining algorithm.

16. The apparatus of claim 8, wherein the apparatus is compliant at least in part with one of an Institute of Electrical and Electronics Engineers (IEEE) 802.11 family of standards, an IEEE 802.15 family of standards, an IEEE 802.16 family of standards, and a third generation partnership project (3GPP) Long Term Evolution (LTE) standard.

17. The apparatus of claim 8, further comprising another logic to represent each log likelihood ratio (LLR) value of each of one or more bits of each symbol of the HARQ burst with a number of quantization bits, wherein the number of quantization bits is based at least in part on a metric sensitivity to noise of each bit of each symbol.

18. A method comprising:
determining that a buffer has insufficient space to store an uplink (UL) hybrid automatic repeat request (HARQ) sub-packet, wherein the UL HARQ sub-packet has one or more forward error correction (FEC) blocks; and
storing only a portion of each FEC block of the UL HARQ sub-packet in the buffer responsive to the determination that the buffer has insufficient space.

19. The method of claim 18, wherein each FEC block has one or more slots, and wherein storing only the portion of each FEC block of the UL HARQ sub-packet comprises storing less than all slots of each FEC block.

* * * * *